Patented Dec. 26, 1933

1,940,837

UNITED STATES PATENT OFFICE 1,940,837

STOCK FOOD AND PROCESS OF MAKING SAME

John P. Bartz, St. Louis, Mo., assignor to Ralston Purina Company, a corporation of Missouri No Drawing. Application September 29, 1930
Serial No. 485,319

4 Claims. (Cl. 99—11)

My invention relates to a new form of "molasses" feed for animals and the process of making the same.

The value of molasses as a food for animals has resulted in its incorporation in or mixture with various feed materials, but it has not been readily available as a separate feeding material due to the difficulty and expense of transporting and storing it, and the difficulty of feeding it since at ordinary temperature it is quite fluid and in cold temperature is difficult to remove from containers and to divide into desired portions.

In accordance with my invention I am enabled to form molasses into a non-fluid, non-sticky, semi-solid state whereby it can be easily broken or cut into portions of any desired size and therefore readily fed to and consumed by stock. My process also enables me to incorporate other food materials with the molasses, such as grains and cottonseed or linseed meal.

In carrying out my invention I mix with heated molasses a solution in water of a jellifying agent, such as agar-agar or gelatin, and allow the mixture to cool, whereupon it assumes a "jelly" state which is maintained under all atmospheric temperatures occurring in temperate climates. I may use varying proportions of a jellifying solution but find that I need not employ more than one part of solution to nine parts of molasses to make a jelly as rigid as need be desired, and that in much smaller proportions the jellifying material maintains the molasses in a non-liquid, non-sticky condition. The jellifying solution need not embody more than 7½% of agar-agar and considerably smaller proportions may be employed. The solution is made by boiling the jellifying agent in water until it is all dissolved. The temperature of the molasses at the time the solution is incorporated should preferably be 150° to 180° Fahr.

In carrying out my process I avoid increasing the moisture content of the molasses by first dehydrating the molasses to a moisture content of at least as low as 18% whereby the moisture content of the resulting jelly will not exceed 25%; or I evaporate excess moisture from the mixture of jellifying solution and molasses before allowing the same to go into the jelly state. It is usually found that molasses which contains less than 25% moisture does not mold, and molasses reduced to a jellified form in accordance with my process is much less hygroscopic than liquid molasses and, therefore, my product has desirable keeping quality.

Grains, meals, or other edible materials may be mixed with the treated molasses while it is still in liquid form and the same distribution of these materials will be maintained which exists at the time of jellification. The incorporation of an oily material, such as cottonseed or linseed meal, further reduces the tendency of the completed product to absorb moisture.

While the solidification of "black strap" molasses constitutes what is apparently the most useful application of my fundamental idea of causing a small quantity of a jellifying substance to maintain a much larger quantity of a normally liquid substance in a jellified state, I do not intend that the scope of my invention be so limited as to exclude application to like materials, such as corn syrup, for example, and in the claims I have used the word molasses in the generic sense to include other syrups as well as cane syrup.

Having fully described my invention, what I claim as new and desire to secure by Letters Patent of the United States is:

1. The process for changing a body of molasses from a liquid to a jelly state which consists of heating the molasses, then mixing therewith a solution of a jellifying material in water, the molasses or the mixture being dehydrated to such extent that the mixture has no greater moisture content than the untreated molasses, and allowing the mixture to cool.

2. The process of reducing a body of molasses to a non-fluid, non-sticky state which consists of heating the molasses and then mixing therewith a hot solution of a jellifying agent in water, the jellifying agent comprising not more than 8% of the solution and not to exceed one part of the solution to nine parts of molasses being employed, reducing the moisture content of the mixture to at least 25%, and then allowing the mixture to cool.

3. A stock food consisting mainly of molasses in a jellified state, but having an oily material disseminated therethrough.

4. A stock food consisting of molasses in a jellified condition and other edible material, said material being distributed through the jelly and supported thereby.

JOHN P. BARTZ.